US009466210B2

(12) United States Patent
Arpin et al.

(10) Patent No.: US 9,466,210 B2
(45) Date of Patent: Oct. 11, 2016

(54) STOP VIOLATION DETECTION SYSTEM AND METHOD

(71) Applicant: Comtrol Corporation, New Brighton, MN (US)

(72) Inventors: Bill Arpin, New Brighton, MN (US); Mark Pikkarainen, New Brighton, MN (US)

(73) Assignee: Comtrol Corporation, New Brighton, MN (US)

( * ) Notice: Subject to any disclaimer, the term of this patent is extended or adjusted under 35 U.S.C. 154(b) by 0 days.

(21) Appl. No.: 14/492,550

(22) Filed: Sep. 22, 2014

(65) Prior Publication Data

US 2015/0084790 A1    Mar. 26, 2015

Related U.S. Application Data

(60) Provisional application No. 61/880,966, filed on Sep. 22, 2013.

(51) Int. Cl.
| | |
|---|---|
| *G08G 1/00* | (2006.01) |
| *G08G 1/017* | (2006.01) |
| *H04N 7/18* | (2006.01) |
| *B60R 1/00* | (2006.01) |
| *H04N 5/77* | (2006.01) |
| *G08G 1/04* | (2006.01) |
| *G08G 1/052* | (2006.01) |

(52) U.S. Cl.
CPC .............. *G08G 1/0175* (2013.01); *B60R 1/00* (2013.01); *G08G 1/04* (2013.01); *G08G 1/052* (2013.01); *H04N 5/772* (2013.01); *H04N 7/188* (2013.01); *B60R 2300/50* (2013.01)

(58) Field of Classification Search
CPC .................................................. G08G 1/0175
See application file for complete search history.

(56) References Cited

U.S. PATENT DOCUMENTS

| | | |
|---|---|---|
| 5,038,136 A | 8/1991 | Watson |
| 5,281,948 A | 1/1994 | Estrada |
| 5,382,953 A | 1/1995 | Hauptli |
| 5,406,251 A | 4/1995 | Leis |
| 5,510,764 A | 4/1996 | Hauptli |
| 5,570,127 A | 10/1996 | Schmidt |
| 5,793,420 A | 8/1998 | Schmidt |
| 6,213,047 B1 | 4/2001 | Means et al. |
| 6,738,089 B1 | 5/2004 | Silc |
| 7,633,382 B2 | 12/2009 | Bowler |
| 7,812,711 B2 | 10/2010 | Brown et al. |
| 8,599,260 B1 * | 12/2013 | Vaughn .................... G08G 1/04  348/149 |

(Continued)

OTHER PUBLICATIONS

Rei, Inc., "Our Products-Part No. 622014", A.R.M.O.R.—StopArm Software Brochure, Copyright 2008, 1 pg.

(Continued)

*Primary Examiner* — Van Trieu
(74) *Attorney, Agent, or Firm* — Dicke, Billig & Czaja, PLLC (57) ABSTRACT

A stop violation detection system and method includes at least one sensor mounted to establish a light shield adjacent a first vehicle, at least one image capture device mounted to record at least one image adjacent the first vehicle, and a control unit operatively coupled with the at least one sensor and the at least one image capture device to detect breach of the light shield by a second vehicle and record the breach of the light shield by the second vehicle with the at least one image capture device.

20 Claims, 7 Drawing Sheets

(56) References Cited

U.S. PATENT DOCUMENTS

| | | |
|---|---|---|
| 2003/0070603 A1 | 4/2003 | VanderMolen et al. |
| 2009/0195651 A1 | 8/2009 | Leonard et al. |
| 2012/0063737 A1 | 3/2012 | Gregoire |
| 2012/0177336 A1 | 7/2012 | Bhan |
| 2012/0307064 A1* | 12/2012 | Schenken ............ G08G 1/0175 348/149 |
| 2013/0044219 A1* | 2/2013 | Burry .................. G08G 1/0175 348/149 |
| 2014/0071286 A1* | 3/2014 | Bernal ...................... G06T 7/20 348/149 |

OTHER PUBLICATIONS

Rei, Inc., "Our Products—A.R.M.O.R.—StopArm Software", Copyright 2008, 1 pg.

Rei, Inc., "Stop Arm Violation Software & Reporting", Retrieved Sep. 16, 2013, 4 pgs.

Atkinson, Claire, "Putting a Stop to Illegal Passing", School Bus Fleet, Nov. 2008, 7 pgs.

"Washington state superintendent backs stop-arm cameras", School Bus Fleet, Sep. 13, 2013, 1 pg., Olympia, Washington.

* cited by examiner

STOP VIOLATION DETECTION SYSTEM AND METHOD

CROSS-REFERENCE TO RELATED APPLICATIONS

This application claims priority under 35 U.S.C. §119(e) to U.S. Provisional Patent Application Ser. No. 61/880,966 filed on Sep. 22, 2013, and incorporated herein by reference.

FIELD OF THE INVENTION

The present invention relates generally to a stop violation detection system and method and, more specifically, to detecting and recording vehicles that illegally pass and/or encroach a stopped (or stopping) vehicle, such as a stopped (or stopping) school bus.

BACKGROUND OF THE INVENTION

Most school buses are equipped with flashing red lights and/or extendable stop sign(s) and/or stop-arm(s) to notify motorists that the school bus has stopped to drop off or pick up passengers, such as children. By law, in most jurisdictions, motorists are required to stop and wait until the flashing red lights are turned off and/or the stop sign(s) and/or stop-arm(s) are retracted. Motorists that disobey the flashing red lights and/or the extended stop sign(s) and/or stop-arm(s) and drive past the stopped school bus (hereinafter referred to as "stop-arm violations"), not only violate motor vehicle laws, but also endanger the lives of the children. Unless observed by a law enforcement officer, however, most incidents of stop-arm violations result in no consequences for the motorist.

Existing systems for identifying stop-arm violations may utilize a video camera mounted to the side of the bus. While the video camera may be triggered based on the stop sign(s) and/or stop-arm(s) being deployed, video sequences are recorded for each stop of the bus. Thus, to determine whether any violations (e.g., vehicles passing a stopped bus) have occurred, a human must review all of the video sequences. As the video sequences are recorded for each stop of the bus, and the bus may stop numerous times over the course of a day (or a week), the amount of video to be reviewed may be vast (e.g., several hours of video for a fleet of buses). Such review, therefore, is labor-intensive and costly.

DETAILED DESCRIPTION

The concept being presented is a system and method for detecting and recording stop violations, such as school bus stop-arm violations. More specifically, with the system and method described herein, vehicles that illegally pass and/or encroach a stopped vehicle, such as a stopped school bus, are detected and recorded. As such, the system and method described herein may be used to aid in the prosecution and enforcement of motor vehicle laws, as related to stopped (or stopping) school buses, with the intention of ensuring safety of individuals entering and/or exiting a stopped school bus, such as children getting on or off a stopped school bus.

In one embodiment, the stop violation detection system and method incorporates the following components: one or more time-of-flight (TOF) laser sensors/scanners 110, one or more image capture devices 120 (e.g., cameras), and a control unit 130 with which the other components (sensors/scanners, cameras, etc.) are operatively and/or communicatively coupled so as to operate as a stop violation detection system 100.

The control unit 130 may include a memory and a processor, with associated hardware and/or machine readable instructions (including firmware and/or software) embodied on a computer readable medium, for implementing and/or executing computer-readable, computer-executable instructions for data processing functions and/or functionality of the system and method. As such, and as described below, the system and method uses the time-of-flight (TOF) laser sensor(s)/scanner(s) 110 and the image capture device(s) 120 to automatically detect and record breach of an invisible light shield 140 created by the time-of-flight (TOF) laser sensor(s)/scanner(s) 110.

Figure 1:
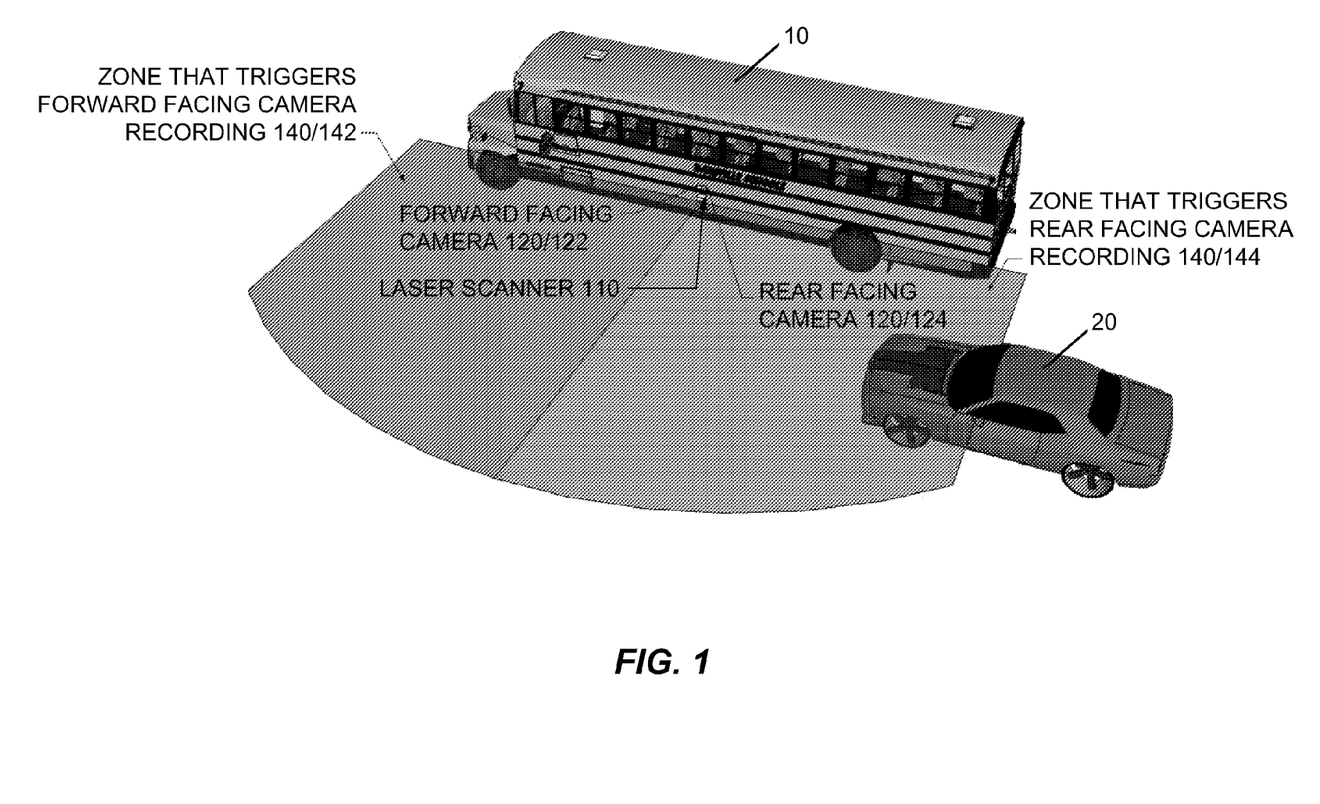
FIG. 1 illustrates one view of one embodiment of a stop violation detection system and method.

In one embodiment, a time-of-flight (TOF) laser sensor/scanner 110 (Lidar) is mounted on a side of a school bus 10 (e.g., a left or street side of the bus) (FIG. 1).

The laser sensor/scanner 110 creates or establishes an invisible light shield 140 (e.g., class-1 infra-red eye safe light shield). In one implementation, the invisible light shield 140 includes a horizontal light shield (FIGS. 2 and 3) established to a side and/or front and/or rear of the school bus 10, with respect to a direction of travel and/or orientation of the school bus 10. As such, in one example, the laser sensor/scanner 110 is mounted on a side of the school bus 10 to establish the horizontal light shield within a preferred height from the ground (e.g., between approximately 3 feet to approximately 4 feet above the ground) to detect other vehicles (e.g., car 20). Although the laser sensor/scanner 110 is illustrated and described as creating or establishing a horizontal light shield, the laser sensor/scanner 110 (or other laser sensor(s)/scanner(s)) may be used to create or establish a vertical light shield (or light shield at any other angle). An exemplary time-of-flight (TOF) laser sensor/scanner useable with the system and method described herein includes an LMS182 Laser Scanner by Sick AG.

In addition to functioning as a detection device, the laser sensor/scanner 110 also functions as a measurement device. In one embodiment, the invisible light shield 140 of the laser sensor/scanner 110 creates a measurement "curtain" within which a specific zone or zones may be created. As such, each zone may have specific criteria (i.e., its own criteria) based on, for example, the size and time of an object (e.g., vehicle) in that zone. More specifically, in one example, each zone may have a size discrimination such that smaller objects will not "trigger" an event, such as recording, as described below. The laser sensor/scanner 110, therefore, may be used to create an "intelligent" zone or zones. In one embodiment, multiple zones may be linked together (e.g., with PLC logic) to create a further zone or zones.

With the laser sensor/scanner 110 described herein, a size and/or configuration of the invisible light shield 140 may be customized to create the specific zone or zones.

In one embodiment, with the laser sensor/scanner 110 mounted to the side of the school bus 10, the individual zones may be sized and/or configured to extend to the rear of the bus 10 and/or beyond the rear of the bus 10 a predetermined distance, to extend to the front of the bus 10 and/or beyond the front of the bus 10 a predetermined distance, and/or to extend to the side of the bus 10 (i.e., outward from the side of the bus) a predetermined distance. Accordingly, a width of the zone may be defined to prevent false positives from occurring in a vicinity of a divided roadway or a center median blocked (e.g., concrete barrier) roadway.

In one embodiment, the laser sensor/scanner 110 is configured to establish a first, forward or front scan or read zone 142 and a second, rearward or rear scan or read zone 144 (FIG. 1). While two zones are illustrated and described, it is understood that any number of zones (i.e., one or more) and/or any configuration of zones may be established.

As such, and as described below, the laser sensor/scanner 110 provides a "triggering" device for recording stop violations. In addition, and as described below, the laser sensor/scanner 110 may collect various information related to stop violations, such as intrusion of a vehicle (e.g., car 20) into a zone and/or speed of a vehicle (e.g., car 20) within a zone, as well as other information of a vehicle, such as a size of a vehicle (e.g., car 20).

As the laser sensor/scanner 110 functions as a measurement device, the laser sensor/scanner 110 may trigger recording only when an object within a zone meets a predefined size criteria. Accordingly, smaller objects, such as humans or bicycles (if applicable), which may cause false positives, may be filtered out.

In one embodiment, the laser sensor/scanner 110 is operatively and/or communicatively coupled to a control unit 130 (FIG. 7), and communicates with one or more image capture devices 120 (FIG. 1) through the control unit 130. As such, and as described below, the laser sensor/scanner 110 initiates capture and recording of one or more images (including still images and/or video) of a vehicle (e.g., car 20) within or passing through a zone of the laser sensor/scanner 110 with the one or more image capture devices 120.

In one embodiment, the one or more image capture devices 120 are mounted on a side of a school bus 10, and include a first, front or forward facing image capture device 122 and a second, rear or rearward facing image capture device 124 (FIG. 1). As such, in one example, the forward facing image capture device 122 and the rear facing image capture device 124 are mounted on the side of the school bus 10 to capture and record one or more images (including still images and/or video) of a vehicle (e.g., car 20) within or passing through the front zone 142 and/or the rear zone 144, as described below. While two image capture devices are illustrated and described, it is understood that any number of image capture devices (i.e., one or more) may be utilized.

In one embodiment, a breach of the light shield 140 of the laser sensor/scanner 110, including breach of the front zone 142 and/or breach of the rear zone 144, triggers the forward facing image capture device 122 and/or the rear facing image capture device 124 to capture and record one or more images (including still images and/or video) of a vehicle (e.g., car 20) within or passing through the front zone 142 and/or the rear zone 144 (i.e., stop violations). The one or more images (including still images and/or video) include one or more images of the vehicle itself, one or more images of a front and/or rear license plate of the vehicle, and one or more images of a driver of the vehicle.

The image capture device 120 may include a still image camera and/or a video camera which supports onboard recording (e.g., storing to an SD card) and/or network recording (e.g., sending to an NVR/NAS). In addition, once the image capture device 120 receives the input signal from the laser sensor/scanner 110, onboard capabilities of the image capture device 120 may be utilized. For example, recording with the image capture device 120 may be enabled before, during, and/or after the incident.

In one example, with the image capture device 120 "ON", but in a dormant or "standby" state or mode before a zone of the laser sensor/scanner 110 is "triggered", the image capture device 120 may proactively capture the incident, since the image capture device 120 may be "capturing" images before the incident (i.e., stop violation), but not actually saving or storing the images. Thus, based on capabilities of the image capture device 120, the image capture device 120 may retroactively record the incident (e.g., may record 5 seconds before the incident).

Figure 6:
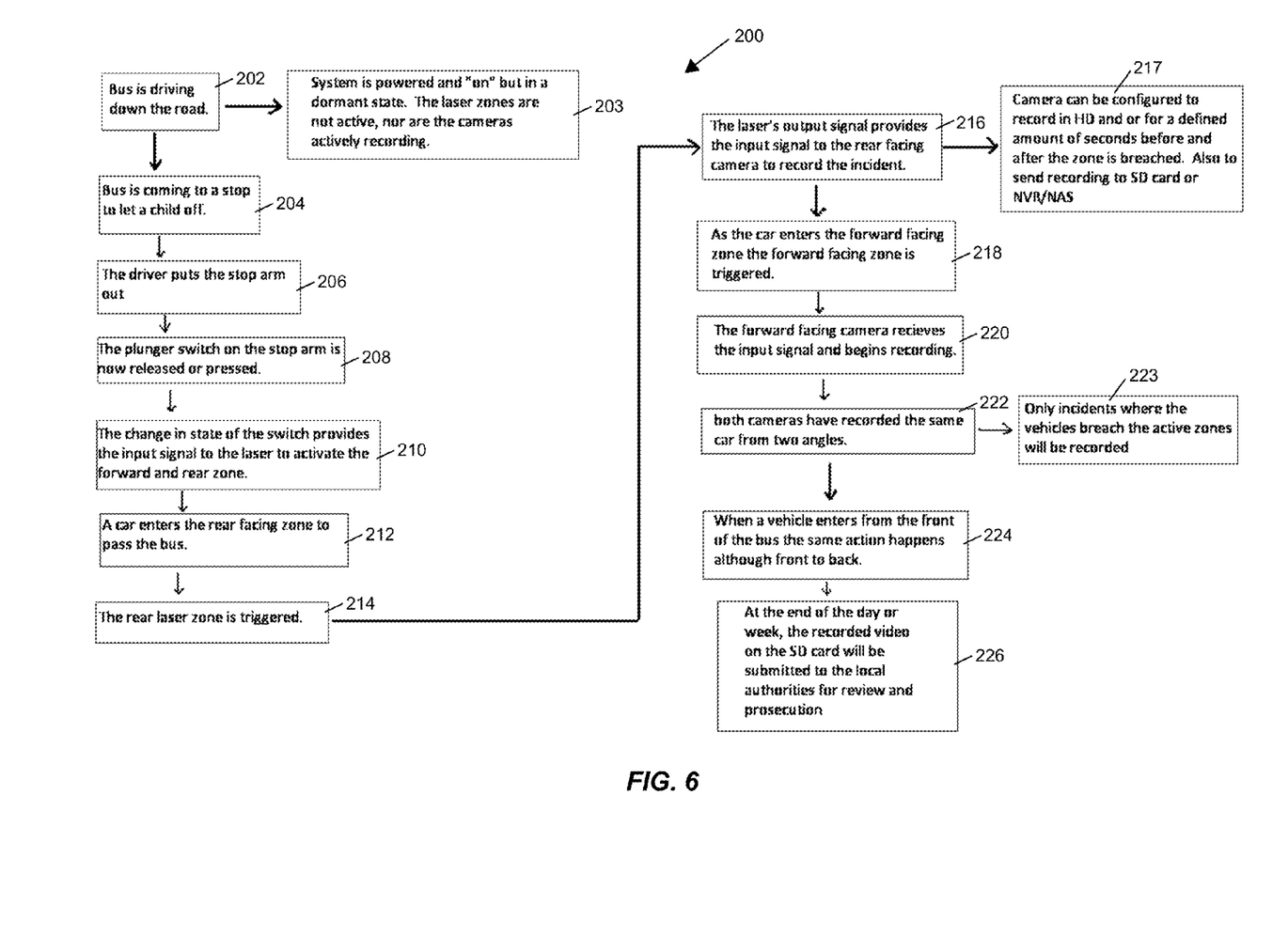
FIG. 6 is a flow chart schematically illustrating one embodiment of a stop violation detection method.

One example of a method 200 of detecting and recording a stop-arm violation is schematically illustrated in FIG. 6. The method may be initiated when the bus 10 is turned "ON" (e.g., ignition engaged). In one embodiment, at 202, the bus is driving down the road. In one embodiment, at 203, with the bus "ON", the stop violation detection system (including the laser sensor/scanner 110 and the image capture devices 120) is powered and "ON". Although the system is powered and "ON", the zones of the laser sensor/scanner 110 are not active and the image capture devices 120 are not actively recording. Rather, the laser sensor/scanner 110 and the image capture devices 120 are in a dormant or "standby" state or mode.

In one embodiment, at 204, with the system powered and "ON", the bus 10 comes to a stop (to allow children to enter and/or exit the bus). In one embodiment, at 206, with stopping the bus (or in coming to a stop), the driver of the bus initiates a stop sequence. The stop sequence includes, for example, turning "ON" the flashing red lights and/or deploying the extendable stop sign(s) and/or stop-arm(s). In one embodiment, at 208, the plunger switch on the stop arm is now released or pressed.

With the stop sequence initiated, the laser sensor/scanner 110 is activated. More specifically, the zone(s) (e.g., the front zone 142 and/or the rear zone 144) of the laser scanner 110 are activated. In one embodiment, the laser sensor/scanner 110 is activated based on initiation of the stop sequence being communicated to the laser sensor/scanner 110. In one embodiment, at 210, deploying the extendable stop sign(s) and/or stop-arm(s) activates a switch (e.g., plunger switch) which, in turn, provides an input signal to the laser sensor/scanner 110 to "activate" (i.e., establish) the laser zone(s), for example, the front zone 142 and the rear zone 144. In one example, deploying the extendable stop sign(s) and/or stop-arm(s) may be associated with operation (e.g., opening) of the school bus door. In addition, turning "ON" the flashing red lights may also send an input signal to the laser sensor/scanner 110 to "activate" (i.e., establish) the laser zone(s). Thus, in one embodiment, although the laser sensor/scanner 110 is "ON" while the bus is "ON", the zone or zones of the laser sensor/scanner 110 are only active when the flashing red lights are "ON" and/or the stop sign(s) and/or stop arm(s) is deployed.

Figure 2:
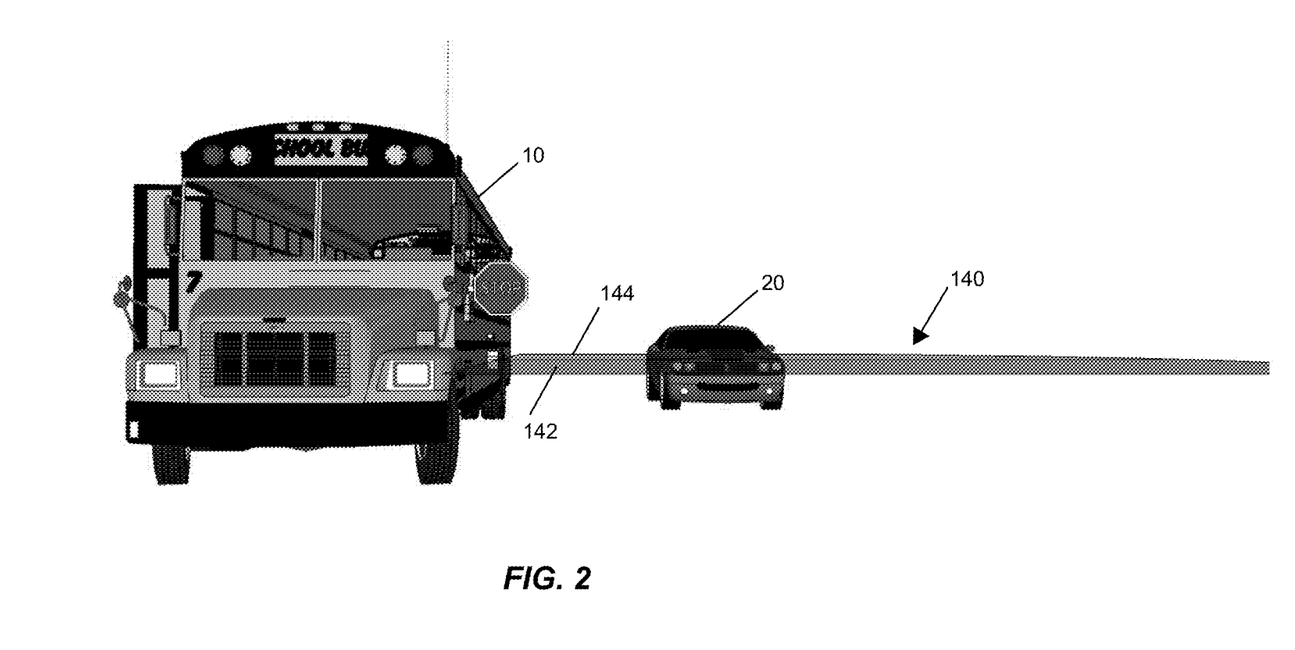
FIG. 2 illustrates another view of one embodiment of a stop violation detection system and method.
Figure 3:
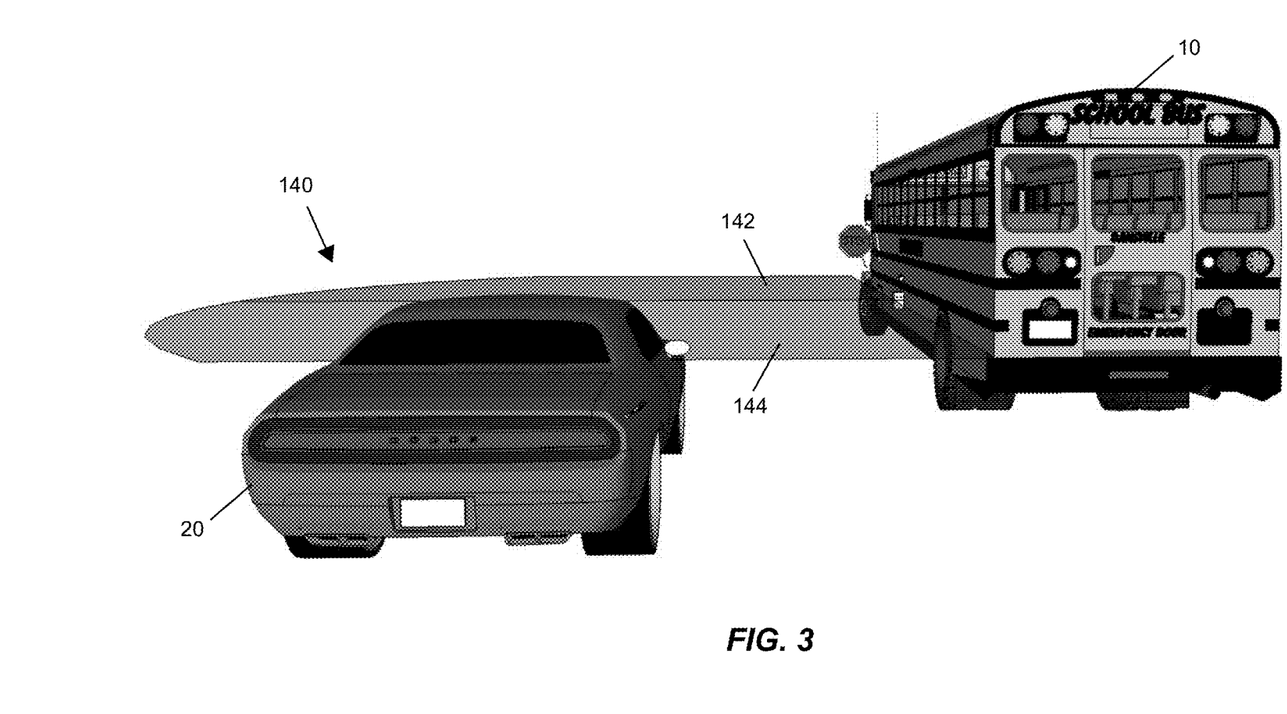
FIG. 3 illustrates another view of one embodiment of a stop violation detection system and method.

With the laser sensor/scanner 110 activated and the zone(s) (e.g., the front zone 142 and/or the rear zone 144) established, breach of or encroachment into the zone(s) is monitored. In one example, at 212, and as illustrated in FIGS. 1, 2, and 3, a breach or encroachment occurs when a vehicle (e.g., car 20) enters the rear zone 144. As such, in one embodiment, at 214, the rear zone 144 of the laser sensor/scanner 110 is "triggered".

With a zone (e.g., rear zone 144) of the laser sensor/scanner 110 "triggered", in one embodiment, at 216, the laser sensor/scanner 110 provides a signal to the image capture device 120 to capture and record one or more images (including still images and/or video) of the vehicle (e.g., car 20) within (or passing through) the zone. In one example, as illustrated in FIGS. 1, 2, and 3, when a vehicle (e.g., car 20) enters the rear zone 144, the rear facing image capture device 124 is activated to record the incident.

In one embodiment, an output signal from the laser sensor/scanner 110 is communicated with and/or provides an input signal to the image capture device 120 (e.g., rear facing camera 124) to record an incident. In one example, at 217, the image capture device 120 (e.g., camera) may be configured to record in high definition (HD), and may be configured to record for a defined or predetermined amount of time (e.g., number of seconds) before, during, and/or after a zone of the laser sensor/scanner 110 is breached. In addition, and as described below, the image capture device 120 (e.g., camera) may save the recording on a secure data (SD) card of the image capture device 120 and/or send the recording to a network video recorder (NVR) or network-attached storage (NAS).

Figure 4:
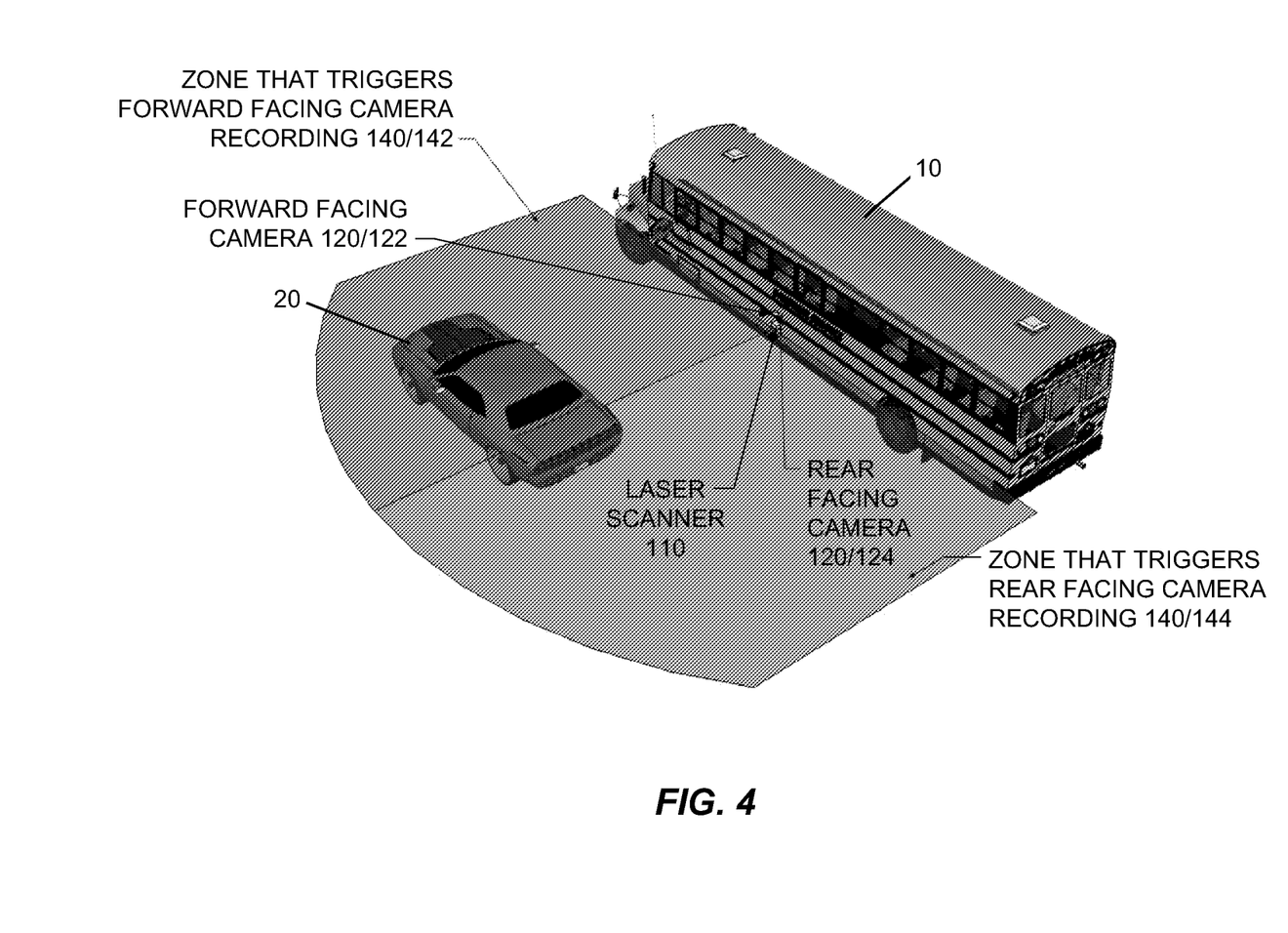
FIG. 4 illustrates another view of one embodiment of a stop violation detection system and method.

In one example, at 218, and as illustrated in FIG. 4, when a vehicle (e.g., car 20) enters the front zone 142 after being in (or passing through) the rear zone 144, the front zone 142 of the laser sensor/scanner 110 is also "triggered". As such, the front facing image capture device 122 is also activated to record the incident. In one embodiment, at 220, an output signal from the laser sensor/scanner 110 is communicated with and/or provides an input signal to the image capture device 120 (e.g., front facing camera 122) to record the incident.

Accordingly, at 222, and as illustrated in the examples of FIGS. 1, 2, 3, and 4, when a vehicle (e.g., car 20) enters and exits (e.g., passes through) the rear zone 144, and enters and exits (e.g., passes through) the front zone 142 after being in (or passing through) the rear zone 144, the rear facing image capture device 124 and the front facing image capture device 122 both record the incident. As such, the incident is recorded from two angles (i.e., two vantage points or perspectives).

In one embodiment, at 223, by using the laser sensor/scanner 110 to create one or more active zones (e.g., the front zone 142 and/or the rear zone 144) adjacent the bus 10 and trigger the image capture device(s) 120 to record incidents of breach or encroachment of the active zone(s), only actual breaches (or encroachments) of the active zone(s) are captured and recorded (as compared to recording all stops of the school bus and/or always recording while the flashing red lights are "ON" and/or the stop sign(s) and/or stop arm(s) is deployed).

Figure 5:
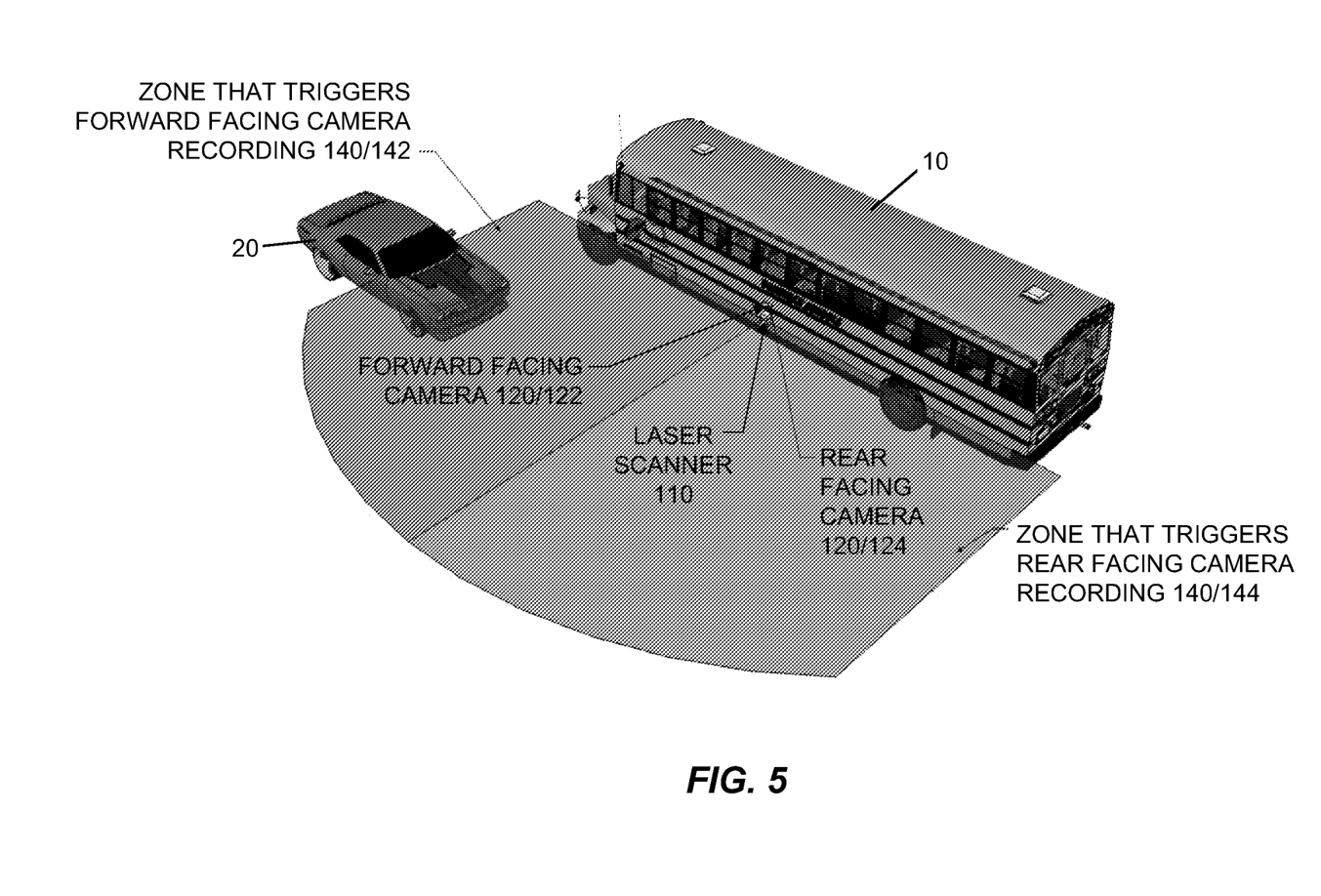
FIG. 5 illustrates another view of one embodiment of a stop violation detection system and method.

In one example, at 224, and as illustrated in FIG. 5, a breach or encroachment also occurs when a vehicle (e.g., car 20) enters the front zone 142 from the front of the bus 10. As such, the front zone 142 of the laser sensor/scanner 110 is "triggered". With the front zone 142 of the laser sensor/scanner 110 "triggered", the laser sensor/scanner 110 provides a signal to the front facing image capture device 122 to capture and record one or more images (including still images and/or video) of the vehicle (e.g., car 20) within (or passing through) the front zone 142. Accordingly, when a vehicle (e.g., car 20) enters the front zone 142 from the front of the bus 10, the front facing image capture device 122 is activated to record the incident. In one embodiment, an output signal from the laser sensor/scanner 110 is communicated with and/or provides an input signal to the image capture device 120 (e.g., front facing camera 122) to record the incident. Furthermore, similar to that described above, when a vehicle (e.g., car 20) enters and exits (e.g., passes through) the front zone 142, and enters and exits (e.g., passes through) the rear zone 144 after being in (or passing through) the front zone 142, the front facing image capture device 122 and the rear facing image capture device 124 both record the incident. Thus, a vehicle (e.g., car 20) encroaching or passing the stopped school bus 10 from either direction will be recorded by both cameras (e.g., the front facing camera 122 and the rear facing camera 124).

In one embodiment, the system is automatically deactivated when the flashing red lights are turned "OFF" and/or the extendable stop sign(s) and/or stop-arm(s) is retracted. More specifically, the laser sensor/scanner 110 and the one or more image capture devices 120 are returned to a dormant or "standby" state or mode whereby the zones of the laser sensor/scanner 110 are not active and the image capture devices 120 are not actively recording.

In one embodiment, at 226, the recorded images (including still images and/or video) are reviewed (e.g., on a routine basis) to assess the recorded stop-arm violations. The recorded images (e.g., stored on the SD card or the NVR/NAS) may be reviewed, for example, at the end of the day or the end of the week. As such, the recorded stop-arm violations may be submitted to local law enforcement authorities for review and prosecution of the violations. Since only actual breaches (or encroachments) of the zone(s) (e.g., the front zone 142 and/or the rear zone 144) of the laser sensor/scanner 110 are captured and recorded (as compared to recordings of all stops of the school bus and/or recordings while the flashing red lights are "ON" and/or the stop sign(s) and/or stop arm(s) is deployed), the amount of time required for review is significantly reduced.

Figure 7:
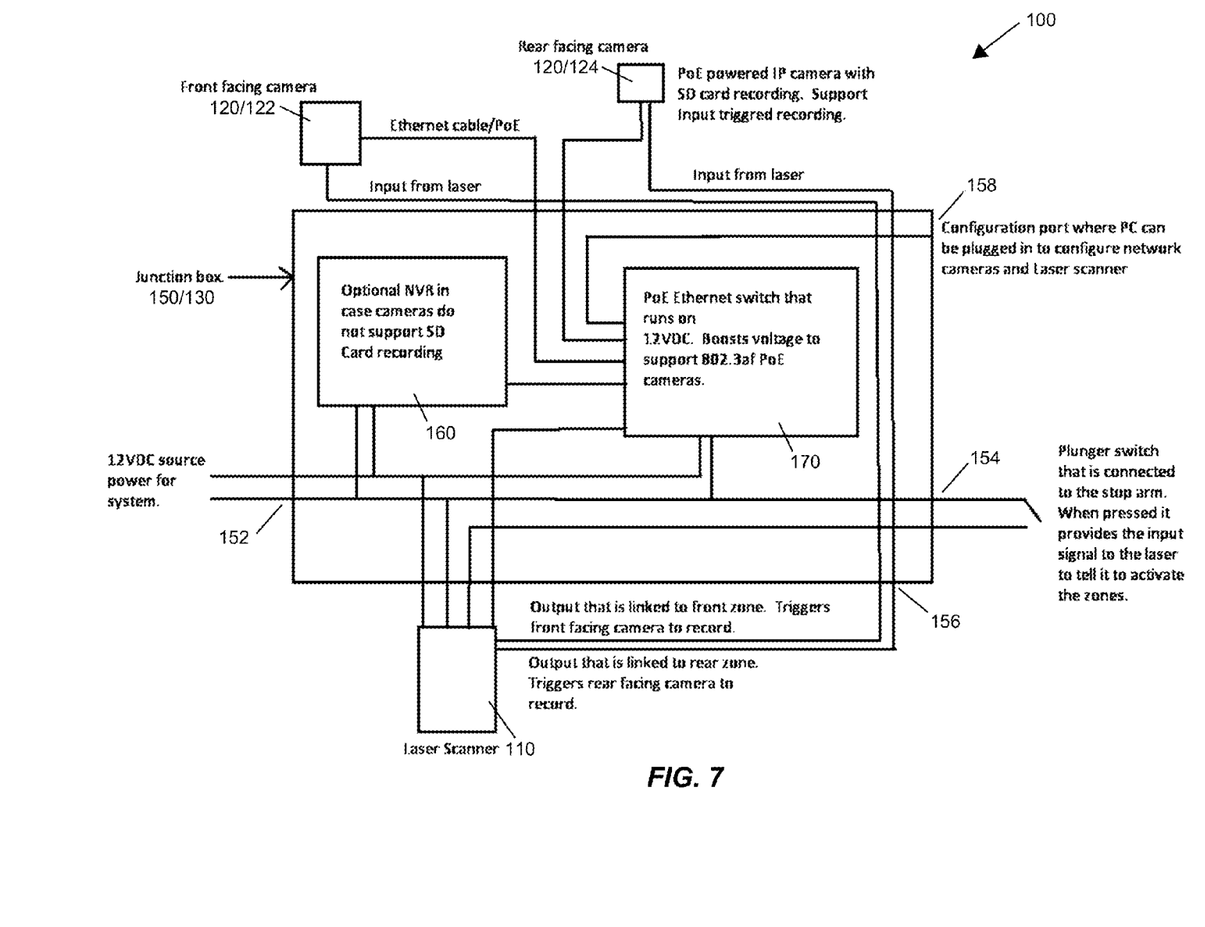
FIG. 7 schematically illustrates one embodiment of a stop violation detection system.

FIG. 7 schematically illustrates one embodiment of a stop violation detection system 100. In one example, components of the system include a laser sensor/scanner 110 (as described above), a front facing camera 122 (as an example of a first image capture device 120), a rear facing camera 124 (as an example of a second image capture device 120), and a junction box 150 (as an example of a control unit 130 or as a component of a control unit 130) with which the other components (e.g., the laser sensor/scanner 110, the front facing camera 122, and the rear facing camera 124) are operatively and/or communicatively coupled.

In one example, the laser sensor/scanner 110 is an LMS 182 Laser Scanner by Sick AG, and has two relay outputs and two digital inputs. In addition, the front facing camera 122 and the rear facing camera 124 are each PoE (Power over Ethernet) cameras, and the system includes an NVR (Network Video Recorder) 160. As such, in one embodiment, the junction box 150 includes a PoE (Power over Ethernet) Ethernet switch 170, and the optional NVR 160. In addition, in one example, at 152, the junction box 150 provides a location to connect 12VDC source power from the bus, and provides power to the optional NVR 160, PoE (Power over Ethernet) Ethernet switch 170, and the laser sensor/scanner 110.

In one example, at 154, the junction box 150 provides a connection point for communication of initiation of a stop sequence (e.g., communication with the plunger switch associated with the stop sign and/or stop arm) to an input of the laser sensor/scanner 110. In addition, in one example, at 156, the junction box 150 provides one or more connection points for communication of output(s) of the laser sensor/scanner 110 to input of the image capture device(s) 120 (e.g., the front facing camera 122 and the rear facing camera 124). Furthermore, in one example, at 158, the junction box 150 provides a connection (e.g., Ethernet connection) for communication with a computing device (e.g., PC) for use in configuration of the laser sensor/scanner 110 and/or configuration of the image capture device(s) 120 (e.g., the front facing camera 122 and the rear facing camera 124).

With the stop violation detection system and method disclosed herein, school bus stop-arm violations may be detected and recorded. More specifically, with the system and method described herein, vehicles that illegally pass a stopped school bus (i.e., passing violations) may be detected and recorded. By using the laser sensor/scanner, as described above, the need for constant or continuous recording, during all stops of the school bus and/or during all instances of the flashing red lights being "ON" and/or the stop sign(s) and/or stop arm(s) being deployed, is eliminated. As such, the stop violation detection system and method disclosed herein may result in shorter, more pertinent, image captures of violation(s) and may significantly reduce the amount of time to review.

In addition to laws which require motorists to stop for a stopped school bus, several states have laws which set forth a minimum distance from the front and/or the rear of a stopped school bus that a vehicle must stop. The distance ranges, for example, from 10 feet to 30 feet from the stopped school bus. As the laser sensor/scanner of the present disclosure has the ability to create a zone to a specified distance from the bus, encroachment or intrusion into the zone by a vehicle (i.e., proximity violations) may be detected and recorded.

Furthermore, multiple states have laws which specify a maximum speed of a vehicle (e.g., 10 mph or 20 mph) when the vehicle encounters flashing amber lights of a school bus (which warn of an impending stop of the school bus). As the laser sensor/scanner of the present disclosure also functions as a measurement device, the laser sensor/scanner may also determine a speed of a vehicle (e.g., 10 mph or 20 mph) within a zone, such that excessive speed of a vehicle (e.g., when the vehicle encounters flashing amber lights of a school bus) (i.e., speed violations) may be detected and recorded.

Accordingly, in addition to monitoring whether motorists stop for a stopped school bus, the stop violation detection system and method disclosed herein may monitor whether motorists stop a sufficient distance from the front and/or the rear of a stopped school bus, and/or may monitor whether motorists slow to (or below) a specified reduced speed when an impending stop of a school bus (e.g., flashing amber lights) is encountered. More specifically, with the stop violation detection system and method disclosed herein, passing violations, proximity violations, and/or speed violations may all be detected and recorded.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A stop violation detection system, comprising:
at least one sensor mounted to establish a light shield adjacent a first vehicle;
at least one image capture device mounted to record at least one image adjacent the first vehicle; and
a control unit operatively coupled with the at least one sensor and the at least one image capture device to:
detect breach of the light shield by an object,
measure a size of the object with the light shield, and
when the size of the object, as measured with the light shield, meets a predefined size criteria, record the breach of the light shield by the object with the at least one image capture device.

2. The system of claim 1, wherein the first vehicle comprises a school bus, and the object comprises a second vehicle of a size that meets the predefined size criteria.

3. The system of claim 1, wherein the light shield comprises a horizontal light shield.

4. The system of claim 1, the light shield to establish a forward zone with respect to orientation of the first vehicle.

5. The system of claim 1, the light shield to establish a rearward zone with respect to orientation of the first vehicle.

6. The system of claim 1, the light shield to establish a zone to a specific distance from the first vehicle.

7. The system of claim 1, the at least one sensor to determine a speed of the object within a zone of the light shield.

8. The system of claim 1, the at least one sensor to determine a size of the object within a zone of the light shield.

9. The system of claim 1, wherein the at least one image capture device comprises a forward facing image capture device with respect to an orientation of the first vehicle.

10. The system of claim 1, wherein the at least one image capture device comprises a rearward facing image capture device with respect to an orientation of the first vehicle.

11. The system of claim 1, the at least one image capture device to retroactively record the second vehicle within or passing through the light shield.

12. A stop violation detection method, comprising:
activating at least one sensor in response to a stop sequence of a first vehicle, including establishing a light shield adjacent the first vehicle with the at least one sensor in response to the stop sequence;
detecting breach of the light shield by an object;
discriminating a size of the object with the light shield; and
in response to the detecting and the discriminating, activating at least one image capture device to record the breach of the light shield by the object.

13. The method of claim 12, wherein the first vehicle comprises a school bus and the object comprises a second vehicle.

14. The method of claim 12, further comprising:
powering the at least one sensor and placing the at least one sensor in a standby mode prior to activating the at least one sensor; and
powering the at least one image capture device and placing the at least one image capture device in a standby mode prior to activating the at least one image capture device.

15. The method of claim 12, wherein establishing the light shield comprises establishing a horizontal light shield adjacent the first vehicle.

16. The method of claim 12, wherein establishing the light shield comprises establishing at least one of a forward zone with respect to an orientation of the first vehicle and a rearward zone with respect to an orientation of the first vehicle.

17. The method of claim 12, further comprising:
   determining a speed of the object within a zone of the light shield.

18. The method of claim 12, wherein discriminating the size of the object includes measuring the size of the object with the at least one sensor.

19. The method of claim 12, wherein activating the at least one image capture device comprises at least one of activating a forward facing image capture device with respect to an orientation of the first vehicle and activating a rearward facing image capture device with respect to an orientation of the first vehicle.

20. The method of claim 12, wherein establishing the light shield comprises defining a zone to a specific distance from the first vehicle.

\* \* \* \* \*